US012735036B2

(12) United States Patent
Jorde et al.

(10) Patent No.: US 12,735,036 B2
(45) Date of Patent: Sep. 15, 2026

(54) METHOD AND DEVICE FOR DETERMINING A SPEED LIMIT IN CONNECTION WITH A ROADWORK SITUATION

(71) Applicant: Bayerische Motoren Werke Aktiengesellschaft, Munich (DE)

(72) Inventors: Nico Jorde, Munich (DE); Romy Profanter, Ulm (DE); Marcus Apel, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 95 days.

(21) Appl. No.: 18/558,845

(22) PCT Filed: May 4, 2022

(86) PCT No.: PCT/EP2022/061906
§ 371 (c)(1),
(2) Date: Nov. 3, 2023

(87) PCT Pub. No.: WO2022/233902
PCT Pub. Date: Nov. 10, 2022

(65) Prior Publication Data

US 2024/0239341 A1 Jul. 18, 2024

(30) Foreign Application Priority Data

May 6, 2021 (DE) ..................... 10 2021 111 877.8

(51) Int. Cl.
*B60W 30/14* (2006.01)
*B60W 50/14* (2020.01)
*G06V 20/58* (2022.01)

(52) U.S. Cl.
CPC .......... *B60W 30/146* (2013.01); *B60W 50/14* (2013.01); *G06V 20/582* (2022.01); (Continued)

(58) Field of Classification Search
CPC ............... B60W 30/146; B60W 50/14; B60W 2420/403; B60W 2552/53; (Continued)

(56) References Cited

U.S. PATENT DOCUMENTS

2015/0345974 A1 12/2015 Takahashi
2016/0046290 A1 2/2016 Aharony et al.
(Continued)

FOREIGN PATENT DOCUMENTS

CN 109598948 A 4/2019
DE 102010027364 A1 * 1/2012 ......... G08G 1/09623
(Continued)

OTHER PUBLICATIONS

DE-102010027364 english translation (Year: 2012).*
(Continued)

*Primary Examiner* — Anne Marie Antonucci
*Assistant Examiner* — Nicholas Patrick Langhorne
(74) *Attorney, Agent, or Firm* — Crowell & Moring LLP

(57) ABSTRACT

A device is provided for determining a value of a speed limit on a roadway on which a vehicle travels. The device is configured to determine that there is a roadwork situation on the roadway on which the vehicle travels. The device is additionally configured to adjust, in reaction to the determination of a roadwork situation, one or more operating parameters of an algorithm for determining the value of the speed limit.

8 Claims, 2 Drawing Sheets

(52) U.S. Cl.
CPC ... *B60W 2420/403* (2013.01); *B60W 2552/53* (2020.02); *B60W 2555/60* (2020.02); *B60W 2556/40* (2020.02)

(58) Field of Classification Search
CPC ......... B60W 2555/60; B60W 2556/40; B60W 2720/10; G06V 20/582; G08G 1/0112; G08G 1/0133; G08G 1/0141; G08G 1/04; G08G 1/09623
See application file for complete search history.

(56) References Cited

U.S. PATENT DOCUMENTS

| | | | | |
|---|---|---|---|---|
| 2017/0066443 | A1* | 3/2017 | Kobayashi | B60W 30/16 |
| 2018/0365507 | A1 | 12/2018 | Hackeloeer et al. | |
| 2020/0180610 | A1 | 6/2020 | Schneider et al. | |
| 2021/0271997 | A1* | 9/2021 | Raut | G06N 20/00 |
| 2022/0172616 | A1* | 6/2022 | Xu | G01C 21/3691 |
| 2023/0360524 | A1* | 11/2023 | Karakayis | G08G 1/09626 |

FOREIGN PATENT DOCUMENTS

| | | | |
|---|---|---|---|
| DE | 10 2012 025 067 | A1 | 6/2014 |
| DE | 10 2014 220 571 | A1 | 4/2016 |
| DE | 10 2015 205 869 | A1 | 10/2016 |
| DE | 10 2016 202 973 | A1 | 8/2017 |
| DE | 10 2017 001 362 | A1 | 10/2017 |
| DE | 10 2017 207 790 | A1 | 11/2018 |
| DE | 10 2018 108 358 | A1 | 10/2019 |
| DE | 10 2018 131 466 | A1 | 6/2020 |
| EP | 3 021 302 | A1 | 5/2016 |

OTHER PUBLICATIONS

International Search Report (PCT/ISA/210) issued in PCT Application No. PCT/EP2022/061906 dated Aug. 19, 2022 with English translation (5 pages).

German-language Written Opinion (PCT/ISA/237) issued in PCT Application No. PCT/EP2022/061906 dated Aug. 19, 2022 with English translation (15 pages).

German-language Search Report issued in German Application No. 10 2021 111 877.8 dated Sep. 7, 2021 with partial English translation (13 pages).

Chinese-language Office Action issued in Chinese Application No. 202280029811.7 dated Jan. 31, 2026 with English translation (22 pages).

* cited by examiner

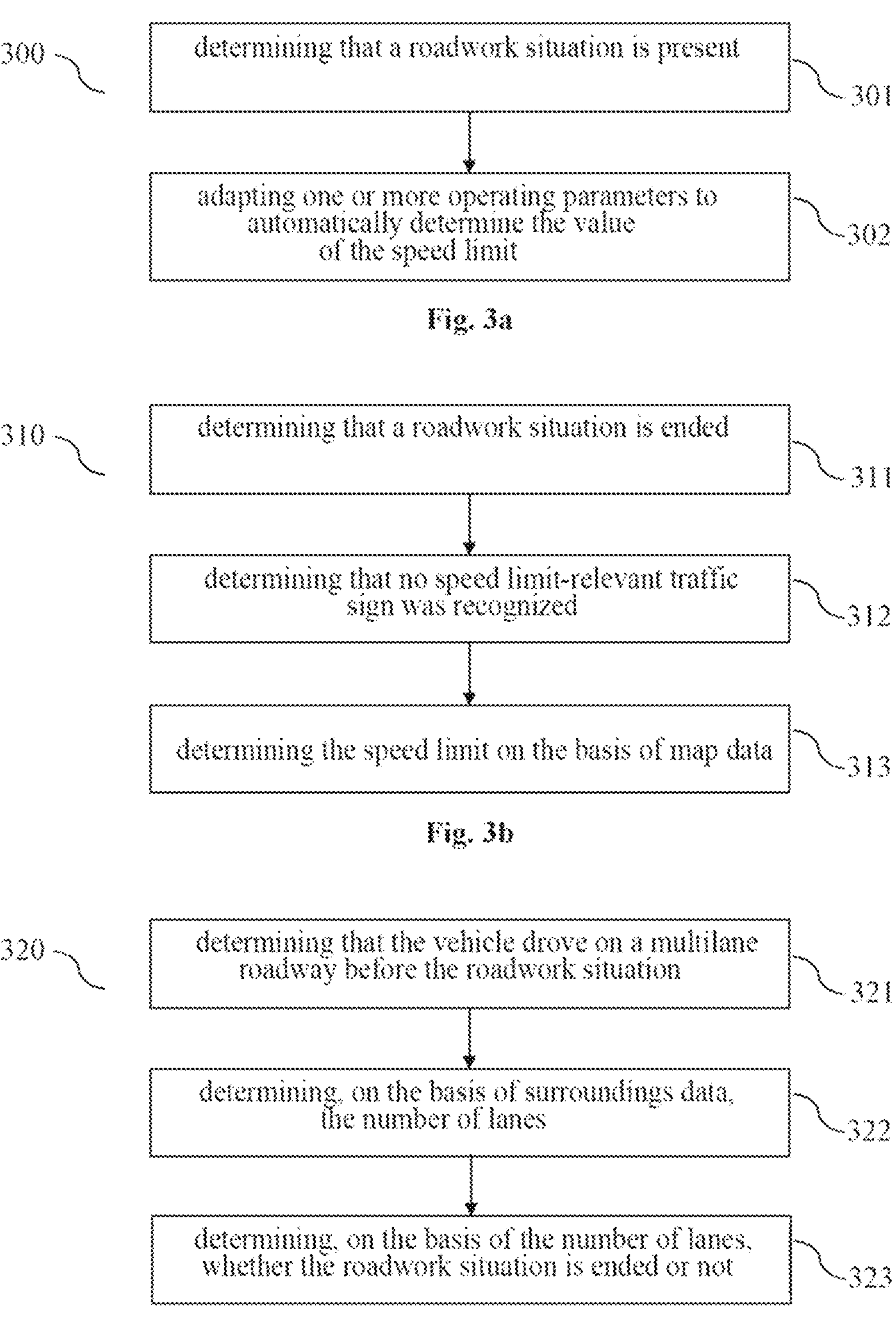
300
determining that a roadwork situation is present
301
adapting one or more operating parameters to automatically determine the value of the speed limit
302
Fig. 3a
310
determining that a roadwork situation is ended
311
determining that no speed limit-relevant traffic sign was recognized
312
determining the speed limit on the basis of map data
313
Fig. 3b
320
determining that the vehicle drove on a multilane roadway before the roadwork situation
321
determining, on the basis of surroundings data, the number of lanes
322
determining, on the basis of the number of lanes, whether the roadwork situation is ended or not
323
Fig. 3c

METHOD AND DEVICE FOR DETERMINING A SPEED LIMIT IN CONNECTION WITH A ROADWORK SITUATION

BACKGROUND AND SUMMARY

The invention relates to methods and corresponding devices for determining the speed limit applicable for a vehicle in or after a roadwork situation.

A vehicle can include a driver assistance system, which is designed to detect and evaluate traffic signs on the basis of the image data of a camera, for example, to determine the currently applicable speed limit. The speed limit can then be accepted automatically in the automated longitudinal guidance of the vehicle or the currently applicable speed limit can be output, in particular displayed, to the driver via a user interface of the vehicle.

The accuracy and/or the reliability with which speed limits can be determined in a roadwork situation are often impaired. The present document relates to the technical problem of increasing the accuracy and/or the reliability of the detection of speed limits in or adjoining roadwork situations.

The object is achieved by the claimed invention. It is to be noted that additional features of a claim dependent on an independent claim, without the features of the independent claim or in combination with only a subset of the features of the independent claim, can form a separate invention independent of the combination of all features of the independent claim, which can be made the subject matter of an independent claim, a divisional application, or a subsequent application. This applies in the same manner to technical teachings described in the description, which can form an invention independent of the features of the independent claims.

According to one aspect, a device for determining a value of a speed limit on a roadway traveled by a (motor) vehicle is described. The roadway can be a one-lane or multiple lane roadway. The value of the speed limit can indicate the highest speed permissible on the currently traveled roadway section of the roadway. The features described in this document are applicable individually or in combination with this device.

The device is configured to determine that on the roadway traveled by the vehicle (in particular in the currently traveled roadway section) a roadwork situation is present. A roadwork situation can have the result that the number of available lanes of the roadway is changed, in particular is reduced (in relation to a standard situation of the roadway, in particular in relation to a standard situation of the currently traveled roadway section). Alternatively or additionally, a roadwork situation can have the result that the course of one or more lanes of the roadway is changed (in relation to a standard situation of the roadway, in particular in relation to a standard situation of the currently traveled roadway section). Alternatively or additionally, a roadwork situation can have the result that the value of the speed limit is locally changed, in particular reduced (in relation to a standard situation of the roadway, in particular in relation to a standard situation of the currently traveled roadway section).

The device can be configured to determine surroundings data from one or more surroundings sensors (in particular from one or more cameras) of the vehicle. The surroundings data can indicate, for example, roadway markings on the roadway, one or more traffic signs on, in particular on the edge of, the roadway, etc. and/or can relate thereto. The device can be configured to determine on the basis of the surroundings data that a roadwork situation is present on the currently traveled roadway section.

The device can furthermore be configured to adapt one or more operating parameters of an algorithm for determining the value of the speed limit in reaction to the presence of a roadwork situation being detected. An adaptation of the algorithm for determining the speed limit can thus take place especially for roadwork situations. The robustness, the reliability, and the accuracy of the determination of speed limits in roadwork situations can thus be increased.

The one or more operating parameters can comprise a distance threshold value for the lateral distance of a traffic sign from the edge of the roadway traveled by the vehicle and/or from a side of the vehicle. The device can thus be configured to use a different distance threshold value for a standard or non-roadwork situation, on the one hand, and for a roadwork situation, on the other hand. The device can be configured in particular here to reduce the distance threshold value (in relation to a standard situation) when the vehicle is located in a roadwork situation.

The device can furthermore be configured, on the basis of the surroundings data of the one or more surroundings sensors (in particular cameras) of the vehicle, to detect a first traffic sign at the edge of the roadway and to determine the lateral distance of the first traffic sign from the edge of the roadway or from the vehicle (while the vehicle is located in the roadwork situation). The lateral distance of the first traffic sign can then be compared to the distance threshold value.

Furthermore, the value of the speed limit can be determined on the basis of the first traffic sign (in particular on the basis of the number or symbol depicted on the first traffic sign) (possibly only) if the lateral distance is less than or equal to the distance threshold value. Otherwise, the first traffic sign can be ignored in the determination of the value of the speed limit if the lateral distance is greater than the distance threshold value.

Due to the consideration of a distance threshold value, relevant and non-relevant traffic signs at the edge of the roadway can be distinguished in a reliable manner. Due to the reduction of the distance threshold value upon the presence of a roadwork situation (in comparison to the distance threshold value upon the presence of a standard situation), the typically constricted conditions of a roadwork situation can be taken into consideration. Furthermore, invalid traffic signs, which are to be attributed to the standard situation otherwise applicable in the currently traveled roadway section, can thus be identified in a particularly reliable manner and excluded from the algorithm for determining the value of the speed limit.

According to a further aspect, a device for determining a value of a speed limit on a (one-lane or multilane) roadway traveled by a (motor) vehicle is described. The value of the speed limit can indicate the highest speed permissible on the currently traveled roadway section of the roadway. The features described in this document are applicable individually or in combination with this device.

The device is configured to determine that a roadwork situation present on the roadway traveled by the vehicle has been ended. This can be recognized, for example, on the basis of the surroundings data of the one or more surroundings sensors (in particular cameras) of the vehicle. Furthermore, it can be determined that the vehicle is now again located on a roadway section without a roadwork situation and/or with a standard situation.

Furthermore, the device is configured to determine that since ending the roadwork situation on the basis of the surroundings data of the one or more surroundings sensors of the vehicle, it has not been possible to detect a traffic sign relevant for the determination of the speed limit (and therefore typically the value of the speed limit determined within the roadwork situation should or could continue to be used). For example, it can be determined that (up to this point, since the end of the roadwork situation), it has not been possible to recognize a "end of roadwork" or a "end of speed limit" traffic sign and/or a new "speed limit" traffic sign.

The device is furthermore configured, in reaction thereto, to determine the value of the speed limit (possibly solely) on the basis of map data with respect to the roadway network traveled by the vehicle. The map data can be stored on a memory unit of the vehicle. The map data can indicate, for example, the course of the individual roadways and/or the position of node points (for example, intersections or roundabouts) between the roadways. Furthermore, the map data can include limit data for each of different roadways of the roadway network with respect to the speed limit applicable on the respective roadway. The limit data can have been determined, for example, by "crowd data sourcing" on the basis of the surroundings data of a large number of vehicles.

By way of the (possibly sole) use of map data, it can be made possible to determine the value of the speed limit following a roadwork situation in a particularly robust manner.

The device can be configured to determine position data (for example, GNSS coordinates) with respect to the current position of the vehicle on the basis of a position sensor (for example, on the basis of a GNSS receiver) of the vehicle. The limit data for the roadway of the roadway network traveled by the vehicle can then be determined on the basis of the map data and on the basis of the position data. The value of the speed limit can then be determined in a particularly reliable manner on the basis of the limit data.

The determined value of the speed limit can be used to assist the user, in particular the driver, of the vehicle. The device can be configured to output output information with respect to the determined value of the speed limit via a user interface of the vehicle to a driver of the vehicle. Alternatively or additionally, the device can be configured to effectuate at least partially automated longitudinal guidance of the vehicle as a function of the determined value of the speed limit. The comfort and/or the safety of the vehicle can thus be enhanced.

According to a further aspect, a device is described for recognizing the end of a roadwork situation on a roadway traveled by a vehicle. The features described in this document are applicable individually or in combination to this device.

The device can be configured to determine that the roadway traveled by the vehicle was multilane before (the beginning of) the roadwork situation. In particular, it can be determined that the vehicle is located on a freeway or an expressway, which was multilane before the beginning of the roadwork situation. Alternatively or additionally, it can be determined that the vehicle is located on a road, the roadway of which is physically separated from the opposite roadway (for example, by guide rails in the middle between the roadway and the opposite roadway). It can then possibly be implicitly presumed that the roadway was multilane before the beginning of the roadwork situation.

Furthermore, the device is configured to determine on the basis of the surroundings data of the one or more surroundings sensors of the vehicle whether the roadway traveled by the vehicle includes at least one further lane in addition to a lane traveled by the vehicle. It can therefore be determined whether the currently traveled roadway section is (again) multilane.

It can then be determined in a reliable manner as a function of the above-mentioned information (in particular as a function of the number of recognized lanes) whether the roadwork situation has ended (or will be ended) or not. In particular, the device can be configured to determine that the roadwork situation is ended or will be ended after a predefined driving route, when it has been determined that the roadway traveled by the vehicle, in addition to the lane traveled by the vehicle, includes at least one further lane. Alternatively or additionally, the device can be configured to determine that the roadway situation is ended or will be ended after a predefined driving route when it has been determined that a transition has taken place from a first roadway section, in which the roadway has not included any further lane in addition to the lane traveled by the vehicle (wherein the roadwork situation was present in the first roadway section), to a second roadway section, in which the roadway includes a further lane in addition to the lane traveled by the vehicle.

Due to the determination and due to the consideration of the number of lanes, the end of a roadwork situation can be determined in a robust manner (possibly even if it was not possible to recognize "end of roadwork" traffic signs or "end of speed limit" traffic signs).

According to a further aspect, a (road) motor vehicle (in particular a passenger vehicle or a truck or a bus or a motorcycle) is described, which comprises at least one of the devices described in this document.

According to one aspect, a method is described for determining a value of a speed limit on a roadway traveled by a vehicle. The method comprises determining that a roadwork situation is present on the roadway traveled by the vehicle. Furthermore, the method comprises, in reaction thereto, adapting one or more operating parameters of an algorithm for determining the value of the speed limit.

According to a further aspect, a method for determining a value of a speed limit on a roadway traveled by a vehicle is described. The method comprises determining that a roadwork situation present on the roadway traveled by the vehicle has ended. The method furthermore comprises determining that since the ending of the roadwork situation, it has not been possible to detect any traffic signs relevant for the determination of the speed limit on the basis of the (overall available) surroundings data of the one or more surroundings sensors of the vehicle. In addition, the method comprises, in reaction thereto, determining the value of the speed limit (possibly solely and/or without consideration of the surroundings data) on the basis of map data with respect to a roadway network traveled by the vehicle.

According to a further aspect, a method for recognizing an end of a roadwork situation on a roadway traveled by a vehicle is described. The method comprises determining that the roadway traveled by the vehicle was multilane before the roadwork situation. Furthermore, the method comprises determining, on the basis of surroundings data of one or more surroundings sensors of the vehicle, whether the roadway traveled by the vehicle includes at least one further lane in addition to a lane traveled by the vehicle. The method furthermore comprises determining whether the roadwork situation has ended or not, as a function of whether the roadway traveled by the vehicle includes at least one further lane in addition to the lane traveled by the vehicle.

According to a further aspect, a software (SW) program is described. The SW program can be configured to be executed on a processor (for example, on a control unit of a vehicle), and to thus carry out at least one of the methods described in this document.

According to a further aspect, a memory medium is described. The memory medium can comprise a SW program, which is configured to be executed on a processor, and to thus carry out at least one of the methods described in this document.

It is to be noted that the methods, devices, and systems described in this document can be used both alone and in combination with other methods, devices, and systems described in this document. Furthermore, any aspects of the methods, devices, and systems described in this document can be combined with one another in a variety of ways. In particular, the features of the claims can be combined with one another in a variety of ways.

The invention will be described in more detail hereinafter on the basis of exemplary embodiments.

BRIEF DESCRIPTION OF THE DRAWINGS

FIG. 3*a* shows a flow chart of an exemplary method for determining a speed limit during a roadwork situation.

FIG. 3*b* shows a flow chart of an exemplary method for determining a speed limit at the end or after ending of a roadwork situation.

FIG. 3*c* shows a flow chart of an exemplary method for recognizing the end of a roadwork situation.

DETAILED DESCRIPTION OF THE DRAWINGS

Figure 1:
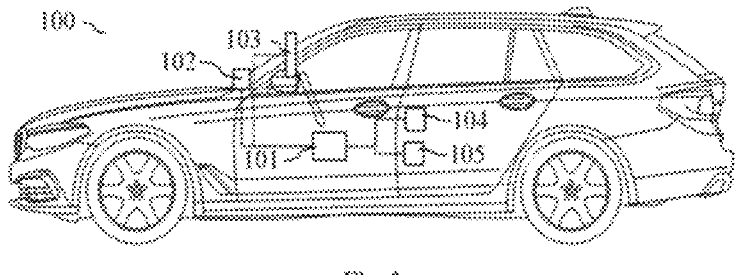
FIG. 1 shows exemplary components of a vehicle.

As described at the outset, the present document relates to increasing the availability and/or the reliability of the automatic recognition of a speed limit in conjunction with (in particular during or at the end of) a roadwork situation. FIG. 1 shows exemplary components of a vehicle 100 in this context. The vehicle 100 comprises one or more surroundings sensors 102, in particular cameras, which are configured to acquire surroundings data (i.e., sensor data) with respect to the surroundings of the vehicle 100. A surroundings sensor 102, in particular a camera, of the vehicle 100 can in particular be configured to acquire surroundings data with respect to the surroundings in front of the front of the vehicle 100.

A (control and/or evaluation) device 101 of the vehicle 100 can be configured to detect and evaluate one or more traffic signs on or about the roadway traveled by the vehicle 100 on the basis of the surroundings data. In particular, the device 101 can be configured to determine the speed limit indicated by a traffic sign on the roadway traveled by the vehicle 100 on the basis of the surroundings data. An image evaluation and/or pattern recognition method can be used for this purpose.

The vehicle 100 can furthermore comprise a position sensor 104 (for example, a receiver of a GNSS, global navigation satellite system), which is configured to determine position data, in particular GNSS coordinates, with respect to the current position of the vehicle 100. Map data with respect to the roadway network traveled by the vehicle 100 (which indicate the course of the different roadways and the position of the different node points of the roadway network, for example, using GNSS coordinates) can be stored on a memory unit 105 of the vehicle 100. The device 101 can be configured to determine the roadway within the roadway network on which the vehicle 100 is currently driving on the basis of the position data and using the map data.

The map data can comprise limit data with respect to the speed limit on the different roadways of the roadway network. The device 101 can be configured to determine the speed limit on the roadway traveled by the vehicle 100 on the basis of the position data and using the map data.

The vehicle 100 can furthermore comprise a user interface 103, for example, having a display unit, such as a display screen. The device 101 can be configured to cause output information with respect to the speed limit determined (on the basis of the surroundings data and/or on the basis of the map data) to be output, in particular displayed, via the user interface 103 to the driver of the vehicle 100. The driver of the vehicle 100 can thus be assisted in the guidance of the vehicle 100.

Alternatively or additionally, the device 101 can be configured to longitudinally guide the vehicle 100 in an at least partially automated manner as a function of the determined speed limit. For example, automatic limiting of the driving speed to the determined speed limit can be effectuated.

Figure 2A:
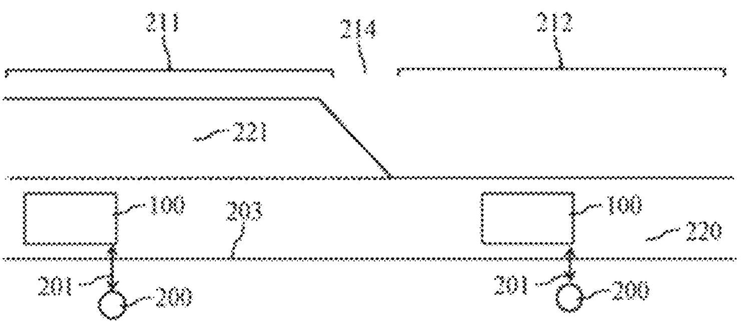
FIGS. 2*a* and 2*b* show different roadwork situations.
Figure 2B:
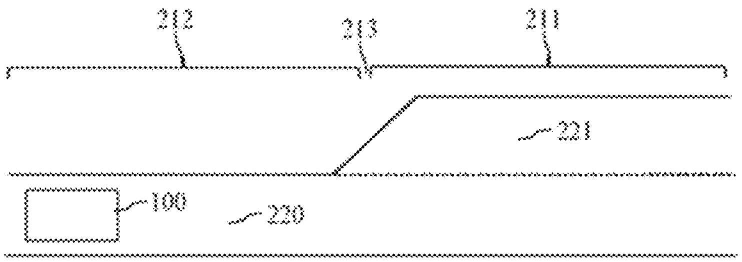

FIGS. 2*a* and 2*b* show different roadwork situations. In particular, FIG. 2*a* shows an exemplary beginning 214 of a roadwork situation 212, having a transition from a standard situation 211 (also designated as a non-roadwork situation) to a roadwork situation 212. FIG. 2*b* shows an exemplary end 213 of a roadwork situation 212, having a transition from the roadwork situation 212 to a standard situation 211.

In the standard situation 211, the roadway traveled by the vehicle 100 can possibly include multiple lanes 220, 221, and in the roadwork situation 212, the roadway traveled by the vehicle 100 can possibly only include one lane 220. The number of lanes 220, 221, which can be recognized on the basis of the surroundings data of the one or more surroundings sensors 102 of the vehicle 100, can be used as an indication to determine whether the vehicle 100 is located in a roadwork situation 212 or in a standard situation 211. In particular, the number of lanes 220, 221 determined on the basis of the surroundings data can be used to recognize the end 213 of a roadwork situation 212.

FIG. 2*a* shows exemplary traffic signs 200 at the edge 203 of the roadway traveled by the vehicle 100, in particular at the edge 203 of the lane 220 traveled by the vehicle 100. A roadwork situation 212 is typically (in comparison to a standard situation 211) relatively constricted, so that the lateral distance 201 of a traffic sign 200 from the roadway edge 203 and/or from the vehicle 100 (for example, from the side of the vehicle 100 facing toward the roadway edge 203) is usually less in a roadwork situation 212 than in a standard situation 211. Furthermore, additional traffic signs 200 are usually set up in a roadwork situation 212, which can possibly result in contradictory speed limit specifications with already existing traffic signs 200, due to which the reliability of the recognition of the respective existing speed limit can be impaired.

The device 101 can be configured to adapt one or more operating parameters of the method or the algorithm for recognizing traffic signs 200, which are relevant for the determination of the speed limit, as a function of whether the vehicle 100 is located in a standard situation 211 or in a roadwork situation 212. In particular, the distance threshold value for the lateral distance 201 of relevant traffic signs 200 can be adapted as a function of whether the vehicle 100 is located in a standard situation 211 or in a roadwork situation

212. The distance threshold value for a roadwork situation 212 can be less here than for a standard situation 211.

The device 101 can be configured, on the basis of the surroundings data, to recognize a traffic sign 200 and to determine the lateral distance 201 of the traffic sign 200 to the roadway or roadway edge 203 or to the vehicle (100). The determined lateral distance 201 can then be compared to the distance threshold value applicable for the respective situation 211, 212. If the lateral distance 201 is less than or equal to the distance threshold value, the traffic sign 200 can thus be taken into consideration in the determination of the speed limit. Otherwise, the traffic sign 200 can possibly remain unconsidered in the determination of the speed limit, if it is determined that the lateral distance 201 is greater than the distance threshold value.

Due to the use of a distance threshold value in a roadwork situation 212, which is reduced in relation to a standard situation 211, traffic signs 200, which are not relevant for the roadwork situation 212, can be identified and excluded in a reliable manner. The quality of the automatic recognition of the speed limit in a roadwork situation 212 can thus be increased.

It can occur that after the end 213 of a roadwork situation 212, it is not possible to recognize traffic signs 200 by which the speed limit applicable during the roadwork situation 212 is canceled. The device 101 can be configured in such a situation to determine the speed limit applicable in the standard situation 211 following the roadwork situation 212 possibly solely on the basis of the map data, in particular on the basis of the speed limit specified in the map data. The speed limit indicated in the map data can be used here until a speed limit can be determined on the basis of the surroundings data of the one or more surroundings sensors 102 of the vehicle 100. The quality and/or the robustness of the determination of the applicable speed limit can thus be increased in an efficient manner.

FIG. 3*a* shows a flow chart of a (possibly computer-implemented) method 300 for determining a value of a speed limit on a roadway traveled by a vehicle 100. The value of the speed limit can indicate the maximum speed which is permissible on the currently traveled roadway here. The method 300 can be carried out by a (control and/or evaluation) device 101 of the vehicle 100. The features of the method 300 are combinable individually or in combination with the other methods 310, 320 described in this document.

The method 300 comprises determining 301 that a roadwork situation 212 is present on the roadway traveled by the vehicle 100. This can be recognized, for example, on the basis of the surroundings data from one or more surroundings sensors 102 of the vehicle 100. Alternatively or additionally, this can be determined on the basis of map data with respect to the roadway network traveled by the vehicle 100.

In the scope of the method 300, in particular the beginning 214 of a roadwork situation 212 can be recognized.

The method 300 comprises, in reaction to the recognized roadwork situation 212, in particular in reaction to the recognized beginning 214 of the roadwork situation 212, adapting 302 one or more operating parameters of an algorithm for determining the value of the speed limit (which applies for the driving within the roadwork situation 212). In this case, in particular the distance threshold value can be adapted (for example reduced), which is used to detect a traffic sign 200 that is relevant and/or to be considered for the determination of the speed limit.

FIG. 3*b* shows a flow chart of a (possibly computer-implemented) method 310 for determining a value of a speed limit on a roadway traveled by a vehicle 100. The features of the method 310 are combinable individually or in combination with the other methods 300, 320 described in this document. The method 310 can be carried out by a device 101 of the vehicle 100.

The method 310 comprises determining 311 that a roadwork situation 212 present on the roadway traveled by the vehicle 100 has ended. This can be determined on the basis of the surroundings data from one or more surroundings sensors 102 of the vehicle 100. In particular the end 213 of the roadwork situation 212 and/or the transition to a standard situation 211 can be recognized here.

Furthermore, the method 310 comprises determining 312 that since ending (i.e., since the end 213) of the roadwork situation 212, it has not been possible to detect a traffic sign 200 relevant for the determination of the speed limit on the basis of the surroundings data from one or more surroundings sensors 102 of the vehicle 100. It can therefore be determined that the speed limit applicable in the standard situation 211 following the roadwork situation 212 cannot be determined on the basis of the surroundings data of the one or more surroundings sensors 102 (in particular not on the basis of a recognized traffic sign 200).

The method 310 furthermore comprises, in reaction thereto, determining 313 the value of the speed limit (possibly solely) on the basis of map data with respect to the roadway network traveled by the vehicle 100. The determination of the value of the speed limit can therefore in particular then be supported (possibly solely) on the map data if it is not possible to detect a traffic sign 200, which indicates the updated value of the speed limit, after the end 213 of a roadwork situation 212.

The map data can be designed here to indicate limit data with respect to the speed limit applicable on the respective roadway for different roadways of the roadway network. The map data can possibly be provided via a wireless communication network in the vehicle 100. The limit data contained therein can have been determined on the basis of the data of a large number of different vehicles 100 during drives through the roadway network.

FIG. 3*c* shows a flow chart of a (possibly computer-implemented) method 320 for recognizing the end 213 of a roadwork situation 212 (and the transition to a standard situation 211) on a roadway traveled by a vehicle 100. The features of the method 320 are combinable individually or in combination with the other methods 300, 310 described in this document. The method 320 can be carried out by a device 101 of the vehicle 100.

The method 320 comprises determining 321 that the roadway traveled by the vehicle 100 (in a standard situation 211) was multilane before the roadwork situation 212. It can furthermore have been recognized here that the roadway was reduced at the transition into the (currently present) roadwork situation 212 from multiple lanes 221, 220 to a (single) lane 220. This can have been determined, for example, on the basis of the surroundings data of the one or more surroundings sensors 102.

Furthermore, the method 320 comprises determining 322 on the basis of the surroundings data of the one or more surroundings sensors 102 of the vehicle 100 whether the roadway traveled by the vehicle 100 (again) includes at least one further lane 221 in addition to the lane 220 traveled by the vehicle 100. In particular, a transition from a one-lane roadway to a multilane roadway can be detected.

The method 320 furthermore comprises determining 323 whether the roadwork situation 212 has ended (or will be ended within a specific driving route) or not, as a function of whether the roadway traveled by the vehicle 100 (again) includes at least one further lane 221 in addition to the lane 220 traveled by the vehicle 100. It can therefore be reliably concluded from the fact that the roadway was multilane before beginning 214 of the roadwork situation 212 (for example, because the roadway is a freeway or an expressway) and that the roadway (possibly after a temporary single lane section, possibly again) is recognized as multilane, that the end 213 of the roadwork situation 212 is present or will be present after a specific upcoming driving route.

The reliability and/or the robustness of the recognition of the respective applicable speed limit upon the presence of a roadwork situation 212 can be increased by the measures described in this document.

The present invention is not restricted to the exemplary embodiments shown. In particular, it is to be noted that the description and the figures are only to illustrate the principle of the proposed methods, devices, and systems by way of example.

The invention claimed is:

1. A device for determining a value of a speed limit on a roadway traveled by a vehicle, wherein the device is configured:

to determine that a roadwork situation is present on the roadway traveled by the vehicle;

in reaction to the roadwork situation, to adapt an operating parameter of an algorithm for determining the value of the speed limit; and at least one of:

to output information with respect to the value of the speed limit via a user interface of the vehicle to a driver of the vehicle; or to effectuate at least partially automated longitudinal guidance of the vehicle as a function of the value of the speed limit, wherein:

the operating parameter is a distance threshold value for a lateral distance of a traffic sign from an edge of the roadway traveled by the vehicle or from the vehicle; and the device is further configured:

based on surroundings data from one or more surroundings sensors of the vehicle, to detect the traffic sign at the edge of the roadway and to determine the lateral distance of the traffic sign to the edge of the roadway or to the vehicle; and to determine the value of the speed limit based on the traffic sign when the lateral distance is less than or equal to the distance threshold value; or to ignore the traffic sign in determining the value of the speed limit when the lateral distance is greater than the distance threshold value.

2. The device according to claim 1, wherein the device is further configured to reduce the distance threshold value when the vehicle is located in the roadwork situation.

3. The device according to claim 1, wherein the device is further configured to reduce the distance threshold value in relation to a standard situation when the vehicle is located in the roadwork situation.

4. A device for determining a value of a speed limit on a roadway traveled by a vehicle, wherein the device is configured:

to determine that a roadwork situation present on the roadway traveled by the vehicle has ended;

to determine that since the roadwork situation has ended, it has been impossible to detect any traffic sign relevant for determining the value of the speed limit based on surroundings data from one or more surroundings sensors of the vehicle;

in reaction to determining that it has been impossible to detect any traffic sign relevant for determining the value of the speed limit based on surroundings data from the one or more surroundings sensors of the vehicle, to determine the value of the speed limit based on map data with respect to a roadway network traveled by the vehicle; and at least one of:

to output information with respect to the value of the speed limit via a user interface of the vehicle to a driver of the vehicle; or to effectuate at least partially automated longitudinal guidance of the vehicle as a function of the value of the speed limit;

wherein the map data include limit data with respect to respective speed limits applicable on different roadways of the roadway network; and wherein the device is further configured to determine that the roadwork situation present on the roadway traveled by the vehicle has ended by:

determining, based on surroundings data from one or more surroundings sensors of the vehicle, that the roadway traveled by the vehicle was multilane before the roadwork situation;

determining, based on surroundings data from one or more surroundings sensors of the vehicle, whether the roadway currently traveled by the vehicle includes at least one further lane in addition to a lane currently traveled by the vehicle; and as a function of whether the roadway currently traveled by the vehicle includes the at least one further lane in addition to the lane currently traveled by the vehicle, determining whether the roadwork situation is ended or not.

5. The device according to claim 4, wherein the device is further configured:

to determine position data with respect to a current position of the vehicle based on a position sensor;

to determine first limit data for the roadway traveled by the vehicle based on the map data and the position data; and to determine the value of the speed limit based on the first limit data.

6. The device according to claim 4, wherein the device is further configured to determine that the roadwork situation present on the roadway traveled by the vehicle has ended when it has been determined:

that the roadway traveled by the vehicle includes the at least one further lane in addition to the lane traveled by the vehicle; and/or that a transition has taken place from a first roadway section in which the roadway has not included a further lane in addition to the lane traveled by the vehicle, to a second roadway section in which the roadway includes a further lane in addition to the lane traveled by the vehicle.

7. A method for determining a value of a speed limit on a roadway traveled by a vehicle, the method comprising:

determining that a roadwork situation is present on the roadway traveled by the vehicle;

in reaction to determining that the roadwork situation is present on the roadway traveled by the vehicle, adapting an operating parameter of an algorithm for determining the value of the speed limit; and at least one of:

outputting information with respect to the value of the speed limit via a user interface of the vehicle to a driver of the vehicle; or effectuating at least partially automated longitudinal guidance of the vehicle as a function of the value of the speed limit, wherein:

the operating parameter is a distance threshold value for a lateral distance of a traffic sign from an edge of the roadway traveled by the vehicle or from the vehicle; and the method further comprises:

based on surroundings data from one or more surroundings sensors of the vehicle, detecting the traffic sign at the edge of the roadway and determining the lateral distance of the traffic sign to the edge of the roadway or to the vehicle; and determining the value of the speed limit based on the traffic sign when the lateral distance is less than or equal to the distance threshold value; or ignoring the traffic sign in determining the value of the speed limit when the lateral distance is greater than the distance threshold value.

8. A method for determining a value of a speed limit on a roadway traveled by a vehicle, the method comprising:

determining that a roadwork situation present on the roadway traveled by the vehicle has ended;

determining that, since the roadwork situation has ended, it has been impossible to detect any traffic sign relevant for determining the value speed limit based on surroundings data from one or more surroundings sensors of the vehicle;

in reaction to determining that, since the roadwork situation has ended, it has been impossible to detect any traffic sign relevant for determining the value speed limit based on surroundings data from the one or more surroundings sensors of the vehicle, determining the value of the speed limit based on map data with respect to a roadway network traveled by the vehicle; and at least one of:

outputting information with respect to the value of the speed limit via a user interface of the vehicle to a driver of the vehicle; or effectuating at least partially automated longitudinal guidance of the vehicle as a function of the value of the speed limit;

wherein the map data include limit data with respect to respective speed limits applicable on different roadways of the roadway network, and wherein determining that the roadwork situation present on the roadway traveled by the vehicle has ended comprises:

determining, based on surroundings data from one or more surroundings sensors of the vehicle, that the roadway traveled by the vehicle was multilane before the roadwork situation;

determining, based on surroundings data from one or more surroundings sensors of the vehicle, whether the roadway currently traveled by the vehicle includes at least one further lane in addition to a lane currently traveled by the vehicle; and determining, as a function of whether the roadway currently traveled by the vehicle includes the at least one further lane in addition to the lane currently traveled by the vehicle, whether the roadwork situation is ended or not.

* * * * *